United States Patent [19]
Peterson et al.

[11] Patent Number: 5,296,665
[45] Date of Patent: Mar. 22, 1994

[54] METHOD OF RESTARTING A PLASMA ARC TORCH USING A PERIODIC HIGH FREQUENCY-HIGH VOLTAGE SIGNAL

[75] Inventors: Jeffrey L. Peterson, Lebanon; William V. Bailey, West Lebanon, both of N.H.

[73] Assignee: Hypertherm, Inc., Hanover, N.H.

[21] Appl. No.: 885,521

[22] Filed: May 19, 1992

[51] Int. Cl.$^5$ .................................................. B23K 9/00
[52] U.S. Cl. .......................... 219/121.57; 219/121.54; 219/121.59
[58] Field of Search ...................... 219/121.54, 121.57, 219/121.56, 75, 121.52, 121.48, 121.59

[56] References Cited

U.S. PATENT DOCUMENTS

| | | | |
|---|---|---|---|
| 3,447,322 | 6/1969 | Mastrup | 219/121.57 |
| 4,791,268 | 12/1988 | Sanders et al. | 219/121.5 |
| 4,943,699 | 7/1990 | Thommes | 219/121.57 |
| 4,996,407 | 2/1991 | Traxler | 219/121.5 |
| 5,036,176 | 7/1991 | Yamaguchi et al. | 219/121.44 |
| 5,086,205 | 2/1992 | Thommes | 219/121.54 |
| 5,111,024 | 5/1992 | Patron et al. | 219/121.54 |

*Primary Examiner*—Mark H. Paschall
*Attorney, Agent, or Firm*—Dike, Bronstein, Roberts & Cushman

[57] ABSTRACT

A high frequency, high voltage starting circuit for a plasma arc cutting torch is operated in pulses to restart the torch if an initial arc extinguishes before the arc transfers to the workpiece. The starting circuit includes a D.C. power supply with its negative output connected to an electrode of the torch. A positive output is connected to a nozzle, and at a higher positive voltage, to a workpiece. A surge injector circuit of a resistor and surge capacitor is connected in parallel with the power supply to supply current to the arc as soon as breakdown occurs. The duration of the interval between restart pulses is sufficient to allow the surge injector circuit to recharge to a value that will reliably restart the arc as the power supply ramps up to a steady state pilot arc current.

2 Claims, 4 Drawing Sheets

METHOD OF RESTARTING A PLASMA ARC TORCH USING A PERIODIC HIGH FREQUENCY-HIGH VOLTAGE SIGNAL

BACKGROUND OF THE INVENTION

This invention relates in general to plasma arc torches. More specifically it relates to a method for reliably starting a transferred arc plasma torch.

Reliable ignition of a plasma arc torch has been a significant problem throughout the development of plasma technology for cutting metallic workpieces. It is particularly important today where multiple cuts are made in unison by multiple torches. All torches should start at substantially the same time; and it is essential that they all start regardless of the precise timing of the start. More generally, reliability of starting is increasingly important as plasma cutting torches are used in robotic applications where human interventions to replace or repair a torch that will not start is a serious detriment to the reliability and cost effectiveness of a large automated operation.

One solution has been contact starting, one form of which is described in commonly assigned U.S. Pat. No. 4,791,268. However, the principal starting technique in use today uses a high frequency high voltage (HFHV) signal coupled to a power line from a D.C. power supply to an electrode of the torch. The HFHV signal induces a spark discharge in a plasma gas flowing between the electrode and a nozzle, typically in a spiral path. A HFHV generator is usually incorporated in a power supply or in a "console" located remotely from the torch and connected to the torch by a lead set.

While a number of HFHV generators are known, e.g. capacitive discharge circuits and high voltage transformers, the most common type, shown in FIG. 1, is a Marconi RF generator. The generator produces, for typical plasma arc ignition purposes, a 5 to 10 kV impulse that oscillates at 1 to 3 mHz. This signal propogates through the lead set to the electrode (cathode) and nozzle (anode) where it ionizes the plasma gas to produce charge carriers. The ionized charge carriers in the plasma gas create a current carrying path that can sustain an arc.

While this technique seems straightforward in practice, it is a difficult and complex problem. At the time of arc ignition, the location of the arc on the electrodes, and its maintenance once it is initially struck depend on many factors that vary, and some of which may be interdependent. The result is that the voltage at which breakdown occurs, and the time at which it occurs, are random events. Some of the factors include the cathode and anode geometries and gap spacing, gas pressures, the type of gas, impurities in the gas, nature of local gas flow around the electrodes (laminar, turbulent, amount of swirl), the materials forming the anode and cathode and their surface condition, the place on the electrode where the arc initiates, the available voltage from the power supply, the transient response of the power supply, and electrode and nozzle wear. Randomness is a function of where the arc initiates on the electrode because the arc usually strikes well up on the body of the electrode. The arc then travels down the electrode to a hafnium or tungsten insert following the swirling path of the gas. The path and the rate at which the arc follows the path are not predictable.

Interaction of these variables further complicates an analysis or control of ignition. A change in the arc current varies the gas pressure in the torch and the gas flow rate. Electrode and nozzle wear alter the physical location of the initial arc strike, the arc path over the electrode, and the time for the arc travel. Gas impurities deposit on the electrode and nozzle; these deposits change the physical location of the arc strike and the arc voltage. In turn, any increase in the arc voltage, regardless of its source, reduces the ability of the surge injection circuit to provide an initial arc current and, once the arc is struck, to act as a current source sufficient to build to and sustain a steady-state pilot arc.

If an arc strikes, but extinguishes before it transfers, the most common general solution to date has been to attempt to restart the torch, and in particular to operate the HFHV generator constantly until the arc strikes and transfers. With a constant HFHV signal, if the arc extinguishes at any point in the ignition process, the starting circuit will automatically and immediately begin to restart the arc. This arrangement is shown in FIG. 3 and will be discussed in more detail below.

This automated restart, however, is also unreliable. At each restart the surge injection circuitry has less stored energy for the arc. The restart sequence ratchets down in energy and progressively lowers the probability of a successful ignition. In a certain percentage of cases the torch will not ignite, even with the steady application of a high voltage, high frequency signal.

It is therefore a principal object of this invention to provide a method of starting a plasma arc cutting torch with a high frequency high voltage signal that is highly reliable despite adverse variations in operating conditions.

Another object is to provide the foregoing advantage in a manner that is compatible with known starting circuits and can be readily retrofitted onto existing systems.

A still further object is to provide a system for starting multiple torches at substantially the same time with a high degree of reliability to facilitate simultaneous cutting operations.

Another object is to provide a plasma cutting torch starting system that is conducive to use with robotics.

Yet another object is to provide a system with the foregoing advantages which has a favorable cost of implementation.

SUMMARY OF THE INVENTION

A high-frequency high-voltage ignition method for plasma arc cutting torch ensures a reliable start by stutter starting, that is, applying the HFHV signal to an electrical power line to the torch in intermittent bursts or pulses. The intervals between the bursts are of sufficient duration that a surge injection circuit, allows the surge capacitor to be fully, or almost fully charged before the application of the HFHV signal. The surge injector circuit is resistor and a capacitor in series with each of them and in parallel with a D.C. output power source. The intervals are preferably at least three times the time constant of the surge injector circuit. Where the power supply is itself powered by an A.C. source, the interval is preferably less than a half cycle of that source.

These and other features and objects of the invention will be more fully understood from the following detailed description which should be read in light of the accompanying drawings.

DETAILED DESCRIPTION OF THE PREFERRED EMBODIMENTS

Figure 1:
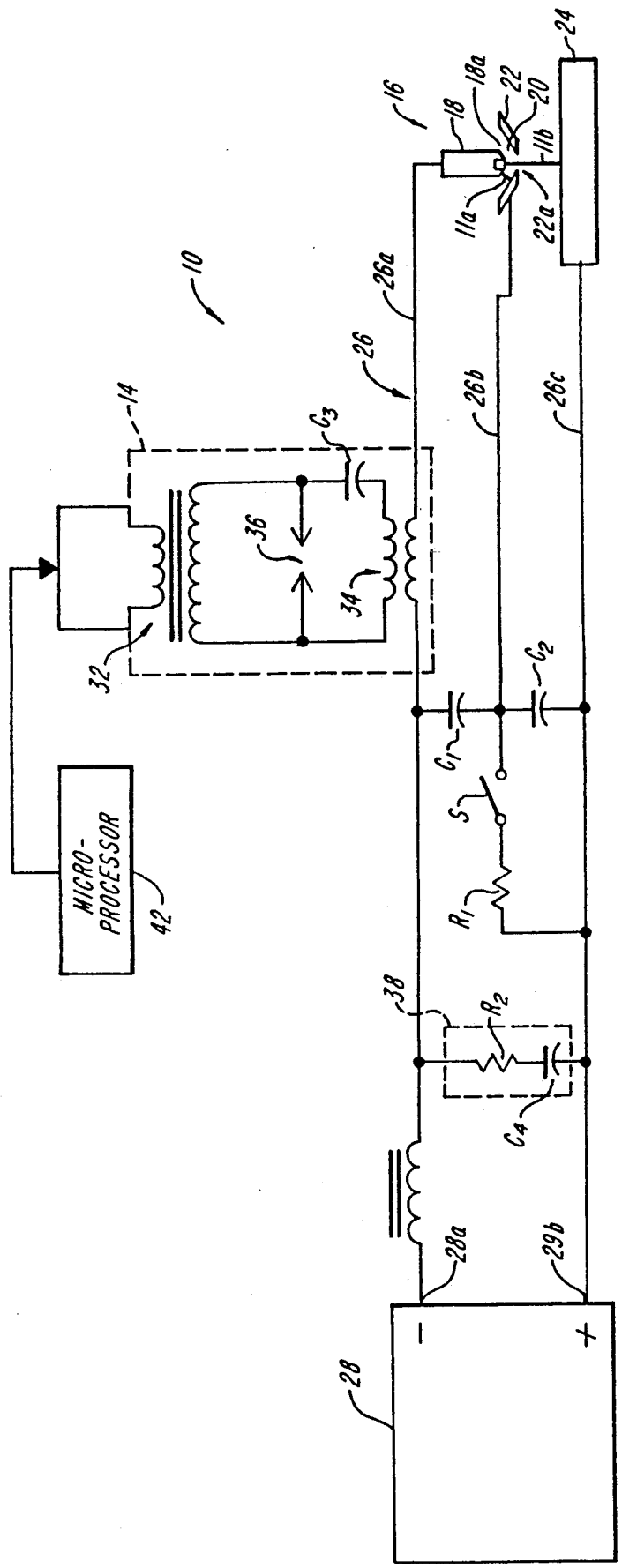
FIG. 1 is a schematic diagram of a starting circuit using a high-frequency high-voltage signal to ignite a plasma arc cutting torch where the circuit is operated according to the present invention.

FIG. 1 shows a conventional high-frequency high-voltage (HFHV) starting circuit 10 which is modified by the inclusion of a microprocessor 12 that controls the operation of a HFHV generator 14 in the manner described below. The circuit 10 initiates a pilot arc 11a in a plasma arc cutting torch 16. The torch has an electrode 18 spaced at a plasma arc chamber 20 from a nozzle 22. The electrode has a hafnium insert 18a at its lower end, opposite an exit orifice 22a. The torch is positioned over a metallic workpiece 24 to be pierced and/or cut. A conventional lead set 26 includes a line 26a connected to the electrode and lines 26b and 26b connected to the nozzle and the workpiece, respectively. The line 26a is also connected to the negative output terminal 28a of a D.C. power supply 28. The lines 26b and 26c connect to a positive output terminal 28b via a common line 26c. A resistor $R_1$ and switch S (which can be an electronic switching circuit such as the arc transfer circuit described in U.S. Pat. No. 4,996,407), are connected between lines 26b and 26c. The resistor R places the workpiece 24 at a higher positive potential than the nozzle 22. This encourages the arc to transfer from the nozzle (pilot arc 11a) to the workpiece (transferred arc 11b). The switch S opens to remove the nozzle from the power circuit once the arc has transferred. This reduces the possibility of double arcing. Decoupling capacitors $C_1$ and $C_2$ connected between lines 26a, 26b and 26c prevent the high frequency signal of the generator from propogating back to the power supply. An iron core inductor 30 is connected in the negative output line 26a.

The HFHV generator is of the marconi type. An iron core step up transformer 32 supplies a high voltage to a resonant circuit formed by a capacitor $C_3$ and an air core transformer 34 having an inductance L. A spark gap 36 is connected in parallel with the resonant RL circuit. As is well known, this circuit produces a high voltage ringing electrical impulse. Typical values of this HFHV signal for plasma arc ignition are 5 to 10 kV at 1 to 3 mHz. The resonant circuit also serves as an insertion transformer for the HFHV signal to the lead set 26. This signal propogates to the electrode 18 (cathode) and nozzle 22 (anode) where the high voltage generates charge carriers in the plasma gas in the chamber 22. These charge carriers create an electrical current path necessary to start an arc in the plasma gas. As noted above, the voltage and time at which breakdown occurs is random for a given set of operating conditions, if it will occur at all.

A surge injection circuit 38 is connected in parallel with the power supply 28. It includes a resistor $R_2$ and a surge capacitor $C_4$ connected in series with one another. The power supply 28 charges the surge capacitor to its open circuit voltage, $V_{oc}$. To start the torch, the charged surge capacitor discharges to provide a current to the torch to initiate and sustain an arc. Ideally the arc strikes shortly after the application of the HFHV signal and the surge circuit acts as a current source while the power supply ramps up from a zero current output to a steady state current, first at a level to sustain the pilot arc 4a, and then at a level to sustain the transferred arc 11b.

Figure 2:
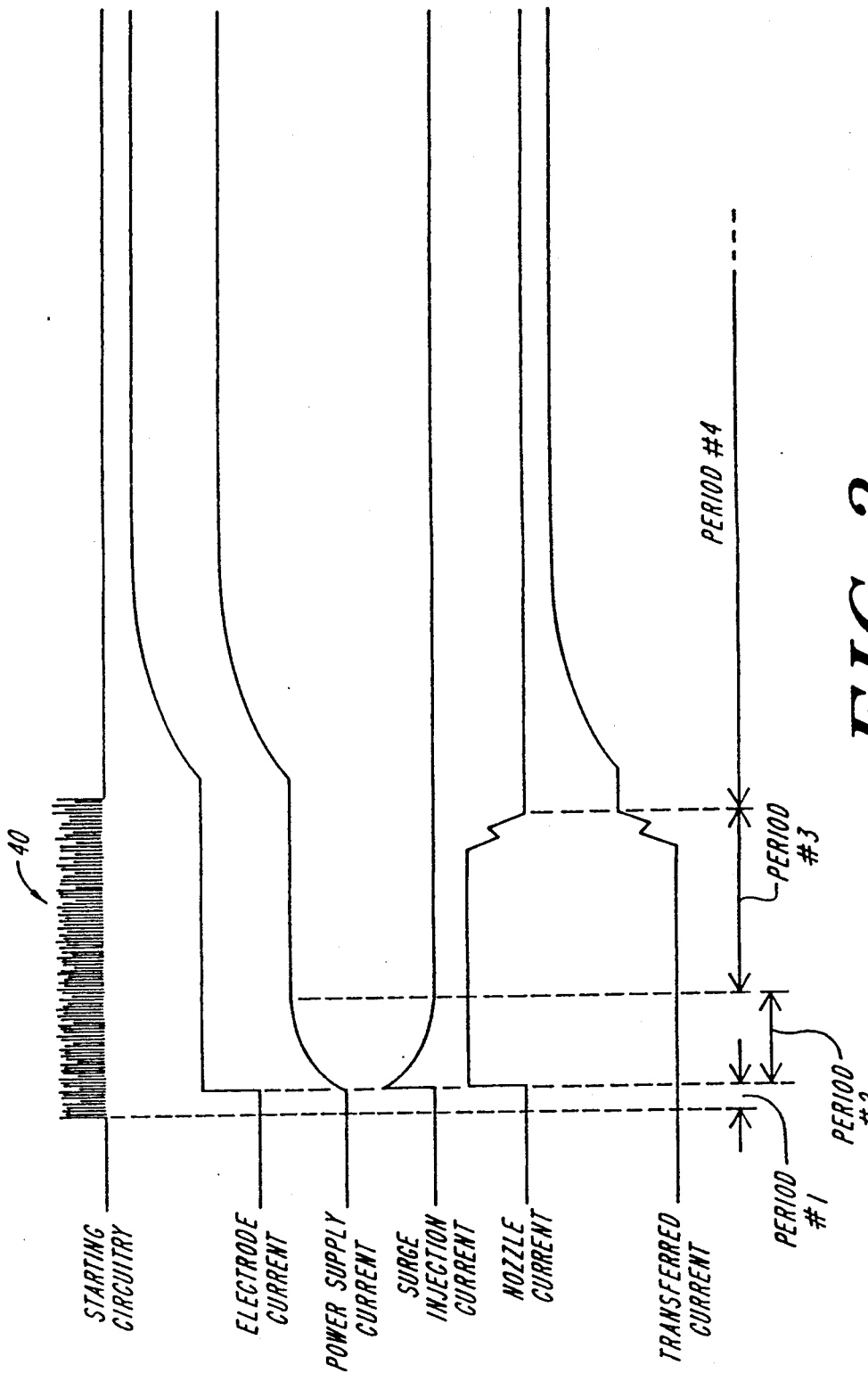
FIG. 2 is a timing diagram of a prior art ignition sequence using prior art HFHV starting, but with no restarting.

FIG. 2 illustrates the use of the circuit shown in FIG. 1 to initiate a transferred arc in the torch 16, but without a microprocessor control 42 operating according to the present invention. FIG. 2 assumes that the initial arc striking proceeds successfully, without an extinguishing of the arc.

This successful starting can be viewed as occuring in four steps or periods. The first step is the initial ionization of a path in the plasma gas between the electrode and the nozzle to produce a breakdown or arc strike. As noted above, it occurs due to the application of the high voltage signal, indicated as 40 in FIGS. 2-4. The high frequency reduces the potential at which breakdown occurs.

The second step or period involves the discharge of the surge capacitor $C_4$ through this ionized path to provide an instantaneous arc current at a level required to sustain the arc 11a. The surge capacitor at the beginning of the starting process has been fully charged by the power supply 28. Once an arc is struck, the power supply 28 also begins to supply current to the torch, although it must ramp up from zero current associated with an open circuit (no current through the torch 16. As shown in FIG. 2, the current from the surge circuit steadily falls during this step while the current produced by the power supply 28 ramps up. The combined currents from the power supply 28 and the surge circuit 38 ideally produce a generally constant pilot arc current between the electrode and the nozzle at a desired value, as shown in FIG. 2.

The level of this steady current is sufficient to sustain a stable pilot arc as the arc follows the path of swirling plasma gas down through the plasma chamber to the orifice 22a. This is the third step or period. The fourth and final stage is when the higher positive potential at the workpiece 24 induces the arc to transfer from the nozzle 22 to the workpiece. When this transfer is detected, the current level is again increased to an operating current level and the circuit to the nozzle is disconnected using switch S. The HFHV signal 40 which has been applied continuously during steps one through four is discontinued on transfer. Piercing and cutting of the workpiece occurs in this fourth step. While it is useful analytically to view the arc initiations in these four steps, it will be understood that the boundaries between these steps are not well defined and the timing of the transition between steps is not well controlled or precisely repeatable. The entire arc initiation process is unpredictable throughout. It is therefore not unusual for an arc to extinguish during this process.

Figure 3:
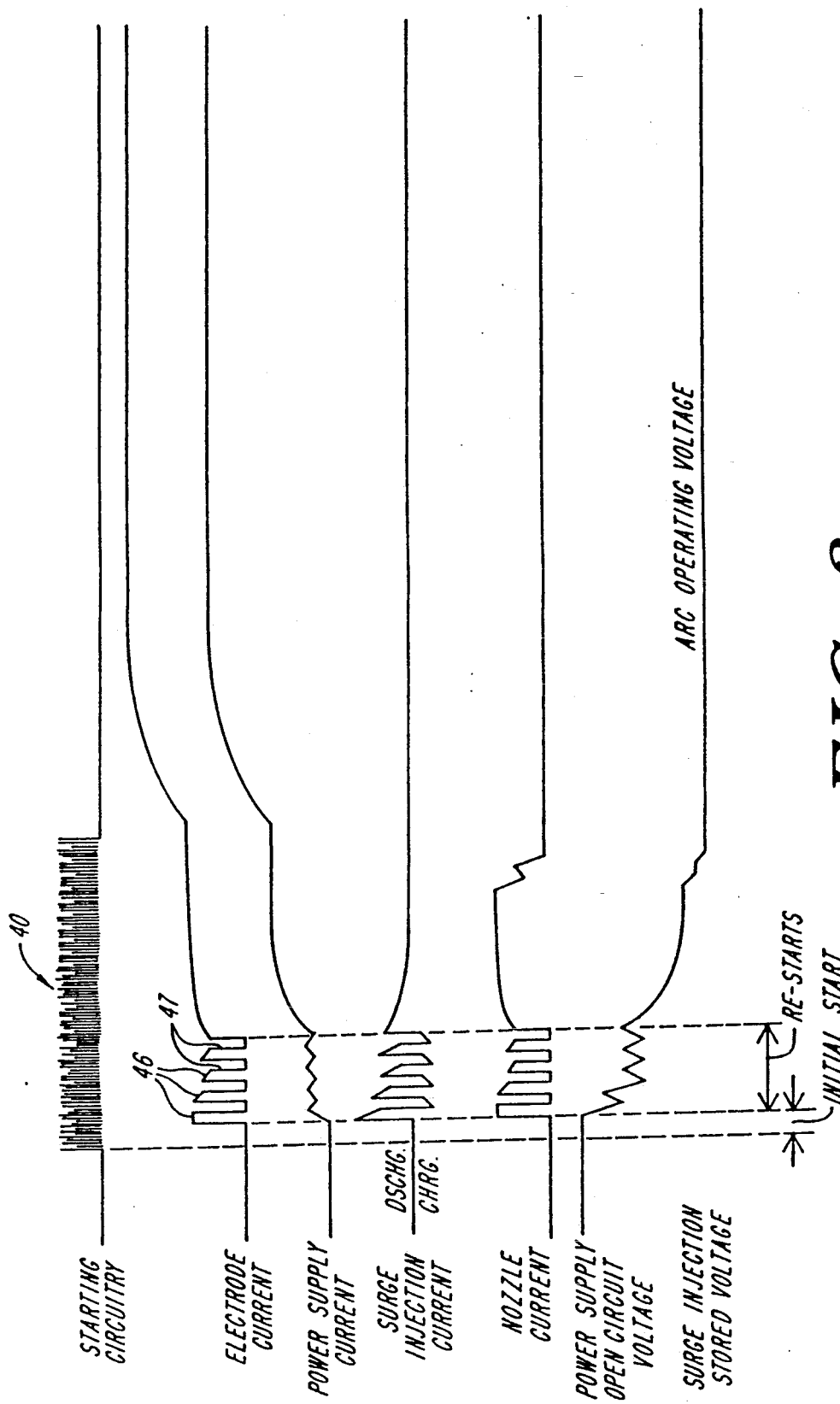
FIG. 3 is a timing diagram corresponding to FIG. 2 showing a prior art HFHV restarting technique.

If the arc extinguishes, FIG. 3 illustrates the prior art technique for restarting the torch 16 with a circuit of the type shown in FIG. 1 but without the microprocessor 42 operating according to the present invention. Multiple restarts 44 are shown as occuring in the second step of ignition. The starting circuitry 14 remains on. As an arc is struck, the surge circuit begins to discharge to supply current to the arc. The power supply also begins to ramp up as in FIG. 2. However, when the arc extinguishes, as at 47, the surge capacitor begins to charge. Current from the power supply sees an open circuit at the torch, but a closed circuit through $R_2$ and $C_4$. The charging of surge circuit is usually not completed before the high frequency, high voltage signal strikes a new arc. If this second restart extinguishes, the process repeats. As shown, there are five restarts before the process enters steps three and four. As in FIG. 2, the HFHV signal continues until transfer. While FIG. 3 shows the arc ignition as eventually being successful, this is not always the case. The repeated restarts can, and often do, ratchet down the stored electrical energy in the surge injection circuit to a level where it is not able to sustain an arc after breakdown. In a multi torch operation or in certain robotic applications the cutting procedure may need to be shut down and the entire array of torches restarted so that the desired cuts are made.

Figure 4:
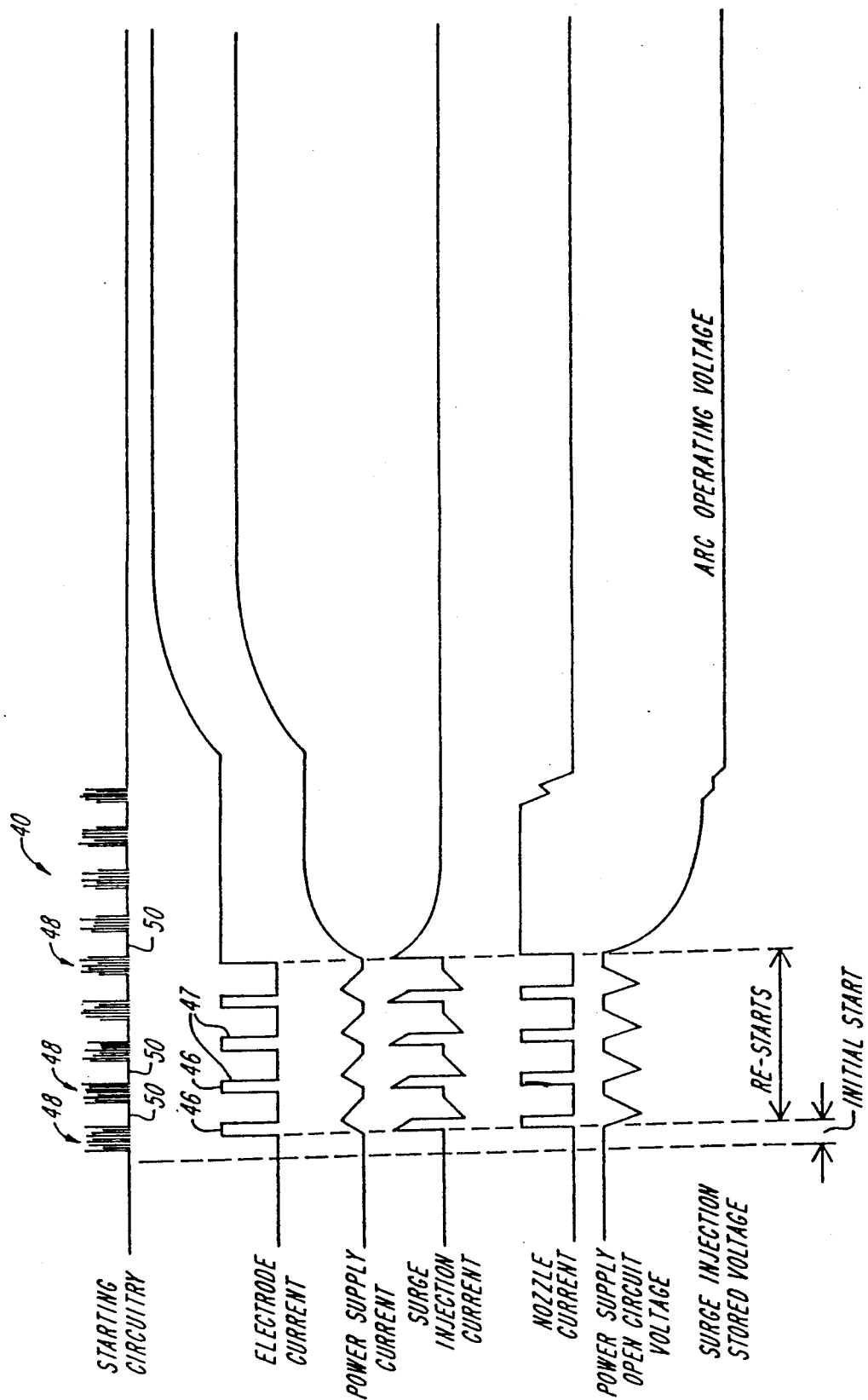
FIG. 4 is a timing diagram corresponding to FIGS. 2 and 3 showing the starting method according to the present invention.

FIG. 4 shows a stutter starting method according to the present invention. The microprocessor 42 controlling the ignition process operates the starting circuit 14 in a pulsed manner as shown in the top line of FIG. 4. Bursts 48 of the HFHV signal are each followed by an interval 50 with no starting signal. The duration of the interval 50 is selected so that the surge capacitor has time to fully, or substantially fully, recharge, as shown in the graph of the surge injection current during multiple restarts 46. During the interval 50, the power supply charges the capacitor to or near its fully charged state. Thus charged, the ignition circuit is in substantially the same condition that it was in when the first start was initiated. This situation has been found to greatly increase the chance that a second or subsequent restart will be successful in igniting a transferred arc. The stutter start does not guarantee torch ignition, but it increases the overall probability of ignition to a level where it is highly certain if the torch components are in normal working order.

By way of illustration, but not of limitation, the open circuit voltage of the power supply ($V_{oc}$) 38 is 250 volts D.C., the pilot arc 11a has a steady state current $I_p$ of about 10 amperes, the torch arc voltage ($V_{arc}$) is 100 volts D.C., and the time required for the power supply to ramp up ($T_{ramp}$) to the 10 amperes is about 3 msec. The values for $R_2$ and $C_4$ can then be derived to achieve these operating conditions and meet the other criteria noted above. On a first striking of the arc, the value of $R_2$ is given by $(V_{oc}-V_{arc})/I_p = (250-100)/10 = 15$ ohm. Using this value for $R_2$, and knowing that the surge capacitor $C_4$ should supply current to the arc at least until the power supply current is at the desired steady state value, $C_{4(min)} = T_{rmp}/R = 3$ msec/15 ohm $= 200$ μf. Therefore $C_4$ in this example should have a value of at least 200 μf.

The calculation of $R_2$ assumes that the only potentials in the circuit initially are the open circuit voltage of the power supply $V_{oc}$ minus the potential across the arc, $V_{arc}$. A value for $V_{arc}$ can be guessed at, and then determined empirically by varying the gas flow conditions.

The "on" time for the output pulses of the starting circuitry 14 is chosen to be a value that is likely to produce an arc ignition. When the power supply is itself powered by a 50 Hz A.C. line, an "on" time of 20 msec is compatible. The "off" time, interval 50, is preferably at least three times the time constant ($R_2C_4$) of the surge circuit. In this time period the capacitor $C_4$ will charge to about ⅔ of its maximum value. In three such periods it approaches its fully charged value, and for the purposes of this invention, can be considered as fully charged. Using the values of $R_2$ and $C_{4(min)}$ calculated above, the time constant is approximately 5 msec. The recommended minimum "off" interval 50 is then 15 msec. In practice 20 msec is chosen as compatible with the aforementioned power line considerations.

There has been described a method of starting a plasma arc cutting torch with a HFHV signal that is highly reliable, readily implemented, flexible and permits the convenient simultaneous operation of multiple torches and the robotic operation of torches.

While the invention has been described with respect to its preferred embodiments it will be understood that various modifications and alterations will occur to those skilled in the art from the foregoing detailed description and the accompanying drawings. For example, various other forms of generating and produced a pulsed output of the HFHV signal can be used. Also, various patterns of pulses can be used, e.g. ones not uniform in duration during the start and restart process, or ones that vary to accommodate varying operating conditions. These and other modifications and variations are intended to fall within the scope of the appended claims.

What is claimed is:

1. A method of reliably starting and maintaining an arc in a plasma arc torch where a high frequency, high-voltage (HFHV) signal initiates a breakdown in a plasma gas flowing between the electrode and the nozzle, and where a surge injection circuit includes a surge capacitor initially charged to a predetermined value and a DC power supply connected across the surge injection circuit, said surge injection circuit supplying current to maintain the arc as a pilot arc and then a transferred arc, comprising pulsing said HFHV signal applied between the electrode and nozzle with intervals between pulses having a time period T which is at least equal to the time required for the power supply to charge the surge injector circuit to a value sufficient to initiate and sustain the pilot arc while the D.C. power supply ramps up from a zero current, open circuit output.

2. The starting method of claim 1 wherein said interval T is equal to at least three times the time constant of the surge circuit.

* * * * *